(12) United States Patent
Niiya

(10) Patent No.: US 7,860,082 B2
(45) Date of Patent: Dec. 28, 2010

(54) TELEPHONE SYSTEM AND TERMINAL DEVICE THEREIN

(75) Inventor: Norimasa Niiya, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 80 days.

(21) Appl. No.: 12/419,919

(22) Filed: Apr. 7, 2009

(65) Prior Publication Data

US 2009/0268719 A1 Oct. 29, 2009

(30) Foreign Application Priority Data

Apr. 24, 2008 (JP) ............................. 2008-114235

(51) Int. Cl.
*H04L 12/66* (2006.01)
(52) U.S. Cl. ...................... 370/352; 370/389; 370/401; 370/338; 370/400; 370/356; 379/106.03; 379/242; 379/9.04
(58) Field of Classification Search ......... 370/352–356, 370/328, 400, 389, 401, 338; 379/9.01–9.04, 379/32.1; 709/223
See application file for complete search history.

(56) References Cited

U.S. PATENT DOCUMENTS

| | | | | |
|---|---|---|---|---|
| 6,396,904 | B1* | 5/2002 | Lilley et al. ................. | 379/9.04 |
| 2006/0104238 | A1* | 5/2006 | Hibino ........................ | 370/328 |
| 2006/0256778 | A1* | 11/2006 | Nakamura ................... | 370/352 |
| 2006/0271664 | A1* | 11/2006 | Ono et al. ................... | 709/223 |
| 2007/0223454 | A1* | 9/2007 | Kimura et al. ............... | 370/352 |
| 2007/0263639 | A1* | 11/2007 | Abe ............................ | 370/400 |
| 2007/0268896 | A1* | 11/2007 | Oyama et al. ............... | 370/389 |
| 2008/0056208 | A1* | 3/2008 | Hinrikus et al. ............. | 370/338 |
| 2008/0101345 | A1* | 5/2008 | Suzuki ....................... | 370/352 |
| 2008/0144636 | A1* | 6/2008 | Ushiyama et al. ........... | 370/400 |
| 2009/0109959 | A1* | 4/2009 | Elliott et al. ................ | 370/352 |

FOREIGN PATENT DOCUMENTS

| | | |
|---|---|---|
| JP | 2005-260419 | 9/2005 |
| JP | 2005-284902 | 10/2005 |
| JP | 2006-309413 | 11/2006 |
| JP | 2007-166146 | 6/2007 |
| JP | 2008-299709 | 12/2008 |

* cited by examiner

*Primary Examiner*—Curtis Kuntz
*Assistant Examiner*—Phung-Hoang J Nguyen
(74) *Attorney, Agent, or Firm*—Blakely, Sokoloff, Taylor & Zafman LLP

(57) ABSTRACT

According to one embodiment, a telephone system comprises a plurality of terminal devices and a main unit. The terminal device realizes telephone communication via a packet-switched network. The main unit accommodates the terminal devices via the packet-switched network. Each of the terminal device comprises an update module, a storing unit, a read module and an access module. The update module updates firmware functioning inside the device in accordance with an instruction from the main unit. The storing unit stores access information for accessing an ante-unit, to which the terminal device is currently connected, before update of the firmware. The read module reads the access information from the storing unit after update of the firmware if an post-unit to which the terminal device is to be connected under the updated firmware differs from the ante-unit. The access module which accesses the ante-unit by using the read access information.

8 Claims, 6 Drawing Sheets

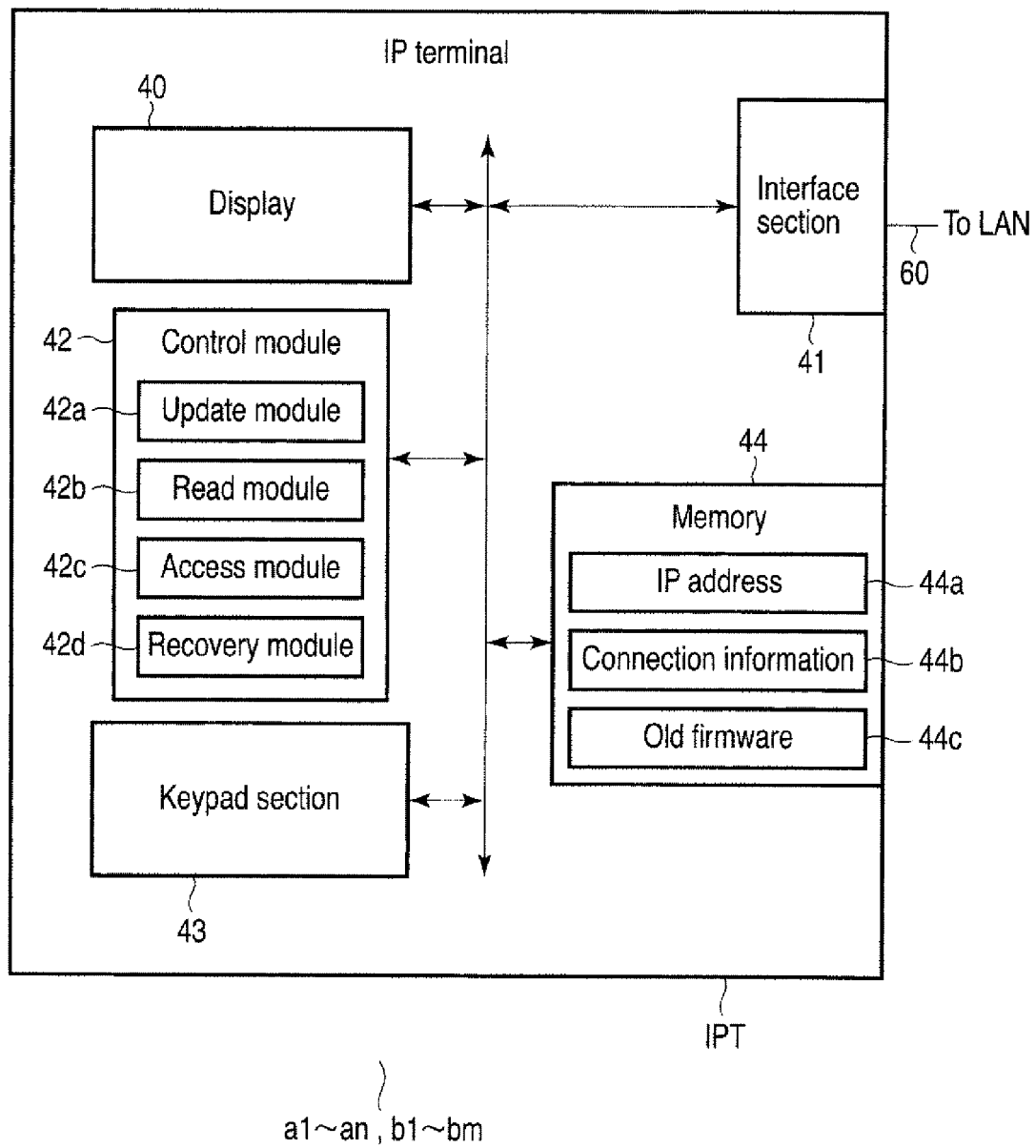
F I G. 2

TELEPHONE SYSTEM AND TERMINAL DEVICE THEREIN

CROSS-REFERENCE TO RELATED APPLICATIONS

This application is based upon and claims the benefit of priority from Japanese Patent Application No. 2008-114235, filed Apr. 24, 2008, the entire contents of which are incorporated herein by reference.

BACKGROUND

1. Field

One embodiment of the present invention relates to a telephone system which implements voice communication between terminals by using a protocol such as Media Gateway Control (Megaco) or Session Initiation Protocol (SIP), and a terminal device in the system.

2. Description of the Related Art

So called Voice over IP (VoIP) which is a technique for performing voice communication by using an Internet Protocol (IP) network has reached the mainstream of current telephone systems. A personal computer, personal digital assistant (PDA), or the like can be used as a telephone by installing a VoIP function in it and connecting it to a local area network (LAN). A system of this type controls outgoing/incoming operation on the basis of IP addresses, and hence can easily relocate a telephone terminal. For example, Jpn. Pat. Appln. KOKAI Publication No. 2005-260419 discloses a technique based on the assumption of the movement of a terminal.

With upgrading of the system, software in a terminal is often updated. In, for example, a cellular phone system, the function of a user terminal is sometimes updated by downloading a new application from a server to the terminal by a push system. A minor function change can be made by such a technique without any problem.

In a case in which a protocol which controls an overall system is to be updated or a case in which a server apparatus functions as the backbone of services is to be replaced, a terminal device is sometimes changed up to a level near hardware layer by updating its firmware entirely.

In this case, a problem arises when the relation between the new and old systems is lost. That is, when the firmware of a terminal device connected to an old main unit is updated to firmware for a new main unit, the terminal after update cannot communicate with the main unit of the old system. As a result, for example, problems A and B arise.

(A) The firmware of a terminal is updated by operation from the old system. After the update, since the terminal is connected to only the new system instead of the old system, the operator of the old system cannot determine whether the firmware has been updated normally.

(B) If the terminal after the completion of firmware update cannot be connected normally to the new system due to some kind of abnormality, the terminal is connected to neither the new system nor the old system. This makes it impossible to do recovery work.

As described above, in existing telephone systems, in a case in which the main unit at the connection destination is to be replaced after the firmware of a terminal is updated, it is impossible to check the normality of update or to recover from an update failure. This poses problems in operation.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is a functional block diagram showing an embodiment of IP terminals (IPTs) a1 to an and b1 to bm in FIG. 1;

DETAILED DESCRIPTION

Various embodiments according to the invention will be described hereinafter with reference to the accompanying drawings. In general, according to one embodiment of the invention, there is provided a telephone system comprising a plurality of terminal devices configured to perform telephone communication via a packet-switched network, and a main unit which accommodates the plurality of terminal devices via the packet-switched network, wherein each of the plurality of terminal devices comprising: an update module which updates firmware functioning inside the device in accordance with an instruction from the main unit; a storing unit which stores access information for accessing an ante-unit, to which the terminal device is currently connected, before update of the firmware; a read module which reads the access information from the storing unit after update of the firmware if an post-unit to which the terminal device is to be connected under the updated firmware differs from the ante-unit; and an access module which accesses the ante-unit by using the read access information.

Adopting such means makes a terminal device store information for access to a main unit before update, i.e., an old main unit (ante-unit), prior to the update of the firmware of the terminal device. Using this access information allows the terminal device to access the ante-unit even after the update of firmware. Making the terminal device notify the ante-unit of the update result via an access module allows the operator of the old system to determine whether the update has been completed normally.

Figure 1:
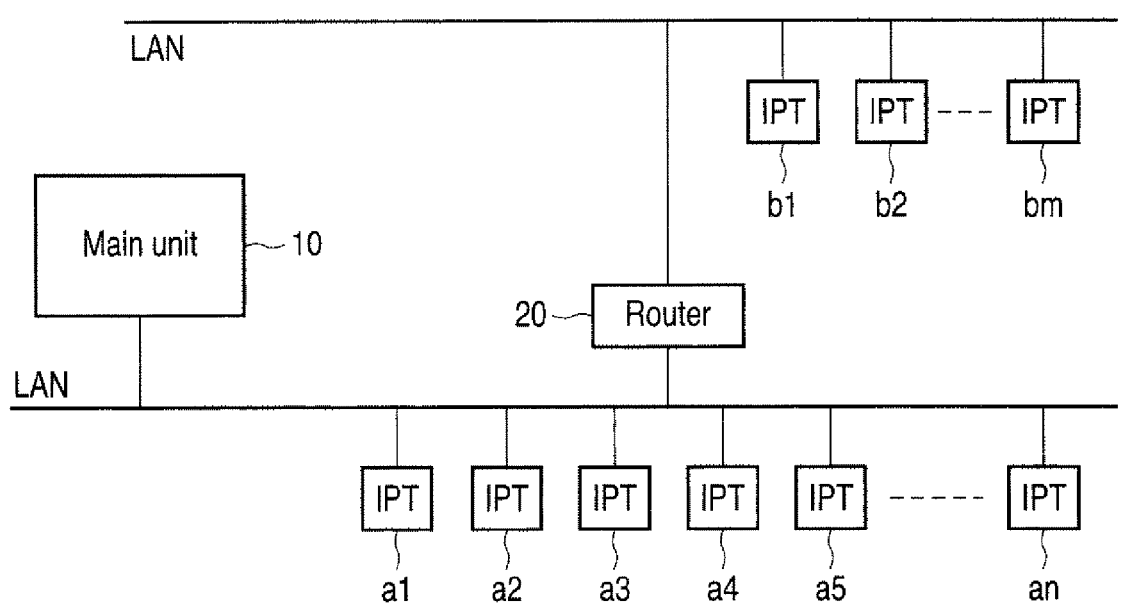
FIG. 1 is a system chart showing an embodiment of a telephone system according to the present invention.

FIG. 1 exemplary shows a telephone system related to this embodiment. The system shown in FIG. 1 comprises a plurality of IP terminals (IPTs) a1 to an and a main unit 10. The IP terminals (IPTs) a1 to an are connected to a LAN. The main unit 10 accommodates the IP terminals a1 to an via the LAN.

Each IP terminal has a telephone communication function. The main unit 10 has a function as an exchange and controls extension line voice communication among the IP terminals a1 to an via the LAN and outside line voice communication via the LAN. The main unit 10 also performs call control for the IP terminals a1 to an, data setting, and maintenance/ operation control such as fault detection. In this embodiment, the IP terminals a1 to an implement voice communication by exchanging IP packets via the LAN. That is, the LAN is a packet-switched communication network which transmits IP packets. In addition, IP terminals b1 to bm are connected to the LAN via a router 20. The main unit 10 systematically controls the IP terminals a1 to an and b1 to bm.

Referring to FIG. 1, the main unit 10 is sometimes replaced by another one with, for example, upgrading of the system. A main unit before replacement will be referred to as an ante-unit, and a new main unit after replacement will be referred to as an post-unit.

According to the embodiment, FIG. 2 exemplary shows each of the IP terminals (IPTs) a1 to an and b1 to bm in FIG. 1. Each IP terminal comprises an interface section 41 connected to the LAN via a LAN cable 60, a display 40, a control module 42, a keypad section 43, and a memory 44. Of these components, the display 40 is a liquid crystal display (LCD), which visually displays various messages. The keypad section 43 includes soft keys, numerical keys, and the like, and accepts input operation by a user.

The memory 44 is a rewritable semiconductor storage device such as a flash memory. The memory 44 stores, in a specified storage area, address information 44a of the main unit 10, various types of connection information 44b necessary for connection to the main unit 10, and program data 44c of old firmware which is currently operating. Of these pieces of information, the address information 44a contains the IP address of the main unit 10 (or its interface card) and a media access control (MAC) address. The connection information 44b contains an extension number necessary for connection by, for example, SIP or Megaco, and the like. In other words, these pieces of information are information necessary for access to the main unit 10.

The control module 42 includes an update module 42a, a read module 42b, an access module 42c, and a recovery module 42d as processing functions associated with this embodiment. The update module 42a updates the firmware functioning inside the self terminal on the basis of an instruction from the main unit 10. Program data for updating is downloaded from the main unit 10 and loaded into the memory 44.

If a main unit to which connection is to be made after the update of the firmware (post-unit) differs from the original main unit (ante-unit), the read module 42b reads the address information 44a of the ante-unit and the connection information 44b from the memory 44 upon completion of update. The access module 42c accesses the ante-unit by using these pieces of access information. If connection cannot be made to the post-unit upon the update of the firmware due to the occurrence of a fault, the recovery module 42d recovers the state before the update by loading the program data of the old firmware (firmware before update) from the memory 44.

The access module 42c, in particular, notifies the post-unit of the read access information after the update of the firmware.

Figure 3:
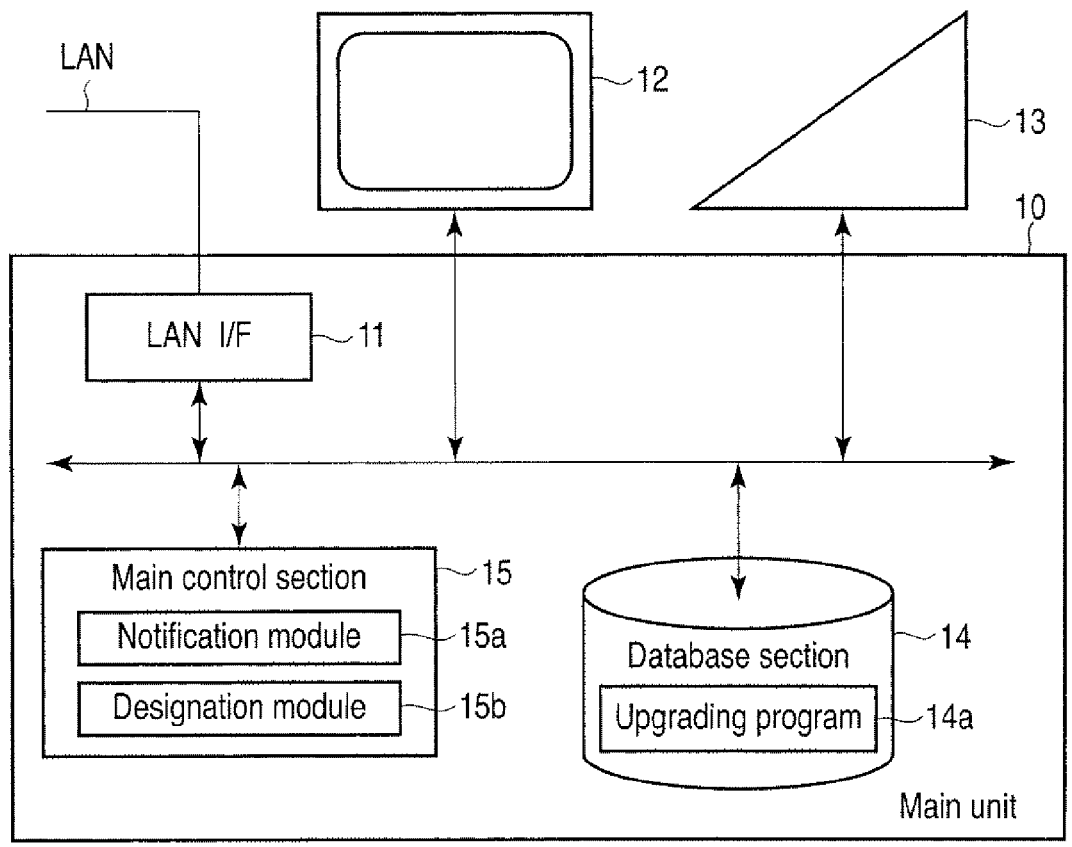
FIG. 3 is a functional block diagram showing an embodiment of a main unit 10 in FIG. 1.

According to the embodiment, FIG. 3 exemplary shows the main unit 10 in FIG. 1. The main unit 10 comprises an interface unit 11, a display 12, an input/output unit 13, a database section 14, and a main control section 15. The interface unit 11 is connected to the LAN and in charge of processing associated with the exchange of packets. The display 12 provides a user interface together with the input/output unit 13, and constructs a graphical user interface (GUI) environment.

The database section 14 is a storage device such as a hard disk drive, and stores an upgrading program 14a. The upgrading program 14a is the latest version of firmware loaded into the IP terminal. When the upgrading program 14a is downloaded into the IP terminal, the firmware is updated to the new version.

The main control section 15 comprises a notification module 15a and designation module 15b as processing functions. The notification module 15a accesses the ante-unit on the basis of the access information notified from the access module 42c of the IP terminal, and notifies the ante-unit of the update result of the firmware (OK or NG).

The function of the notification module 15a, in particular, is selectively enabled or disabled by the designation module 15b. That is, the designation module 15b is a user interface for designating whether the function of the notification module 15a is used to make the IP terminal notify the ante-unit of the update result.

If the notification module 15a is disabled, the IP terminal after update notifies the ante-unit of the update result by directly accessing the unit. If the notification module 15a is enabled, the IP terminal after update notifies the ante-unit of the update result via the post-unit. In this manner, this embodiment adopts the two techniques to notify update results. The operation of the above arrangement will be described separately in the first and second embodiments.

First Embodiment

Figure 4:
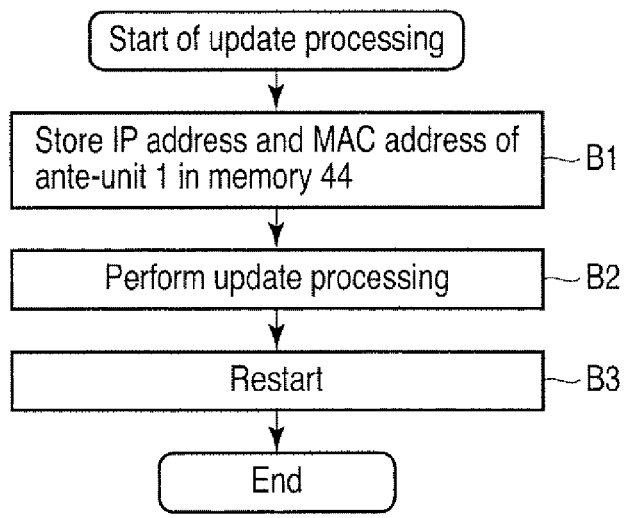
FIG. 4 is a flowchart showing a processing sequence in an IP terminal in the first embodiment of the present invention.
Figure 5:
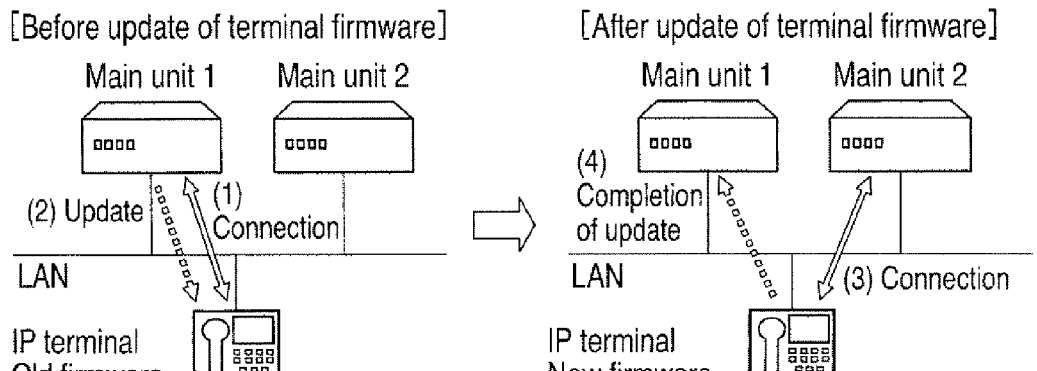
FIG. 5 is a view schematically showing how an IP terminal notifies a main unit of the update of firmware.

According to the first embodiment, FIG. 4 exemplary shows a processing sequence in an IP terminal. As shown in the schematic view of FIG. 5, the following description is based on the assumption that a main unit accommodating an IP terminal changes before and after the update of firmware (from a main unit 1 to a main unit 2). Reference numeral 1 denotes an ante-unit; and 2, an post-unit.

Referring to FIG. 4, when an operator operates the main unit 1 to start the processing of updating the firmware of an IP terminal, the IP terminal stores, in a memory 44, information (a MAC address, an IP address, and the like) for specifying the main unit 1, to which the terminal is currently connected, upon receiving the update instruction (block B1), and performs update processing for new firmware (block B2). Upon completion of the update processing, the IP terminal restarts by itself (block B3), and executes connection processing for the main unit 2 in accordance with the architecture of the new firmware.

Figure 6:
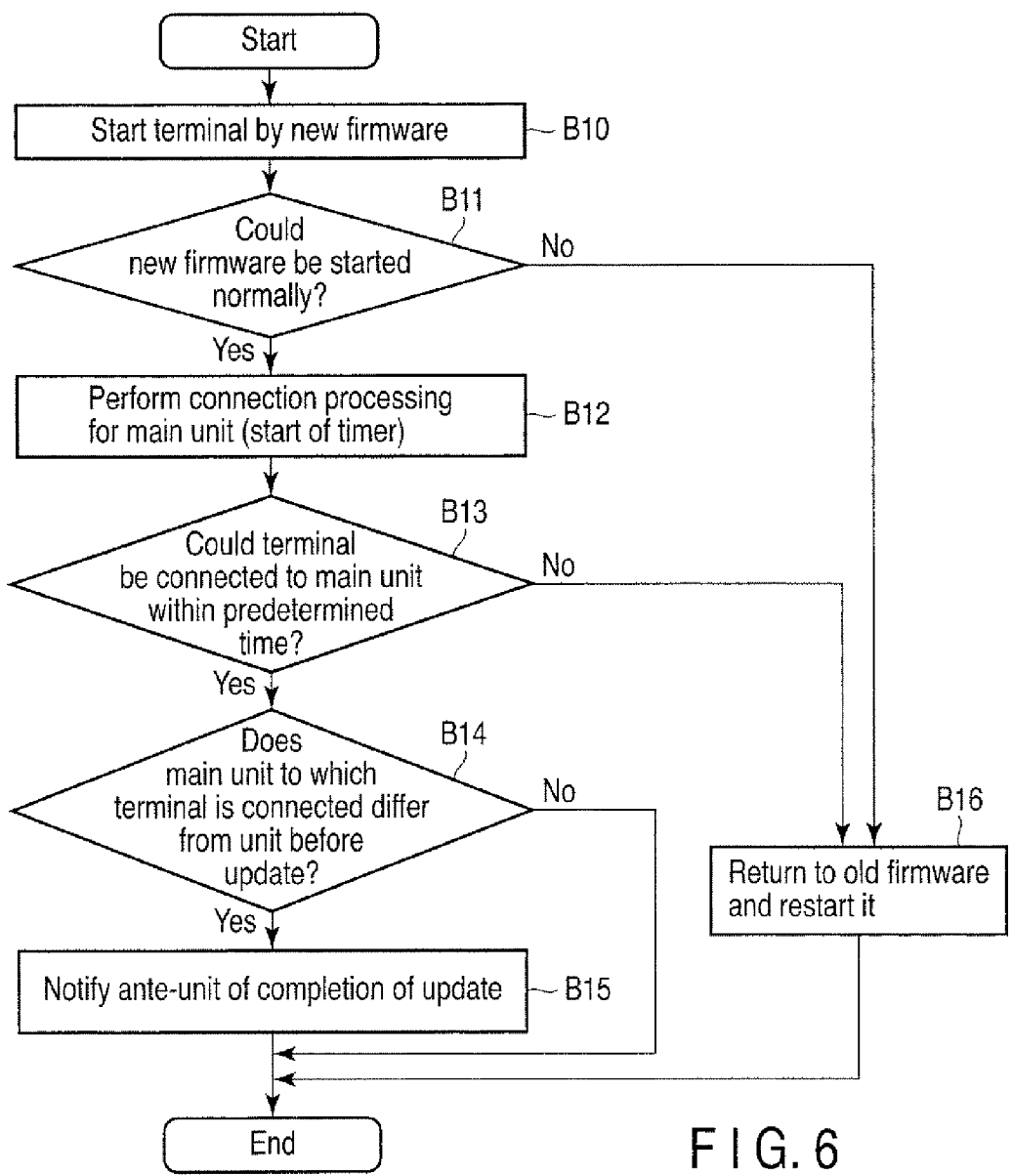
FIG. 6 is a flowchart showing a processing sequence in an IP terminal after firmware update in the first embodiment.

According to this embodiment, FIG. 6 exemplary shows a processing sequence in the IP terminal after the update of the firmware. When the new firmware starts through the sequence in FIG. 4 (block B10), the IP terminal determines whether the terminal has started normally (block B11) under the new firmware. The IP terminal then starts connection processing for the post-unit upon the start of the timer (block B12). If this connection is completed within a specified time (YES in block B13), the IP terminal determines whether the main unit to which it is connected after the update differs from the main unit before the update (block B14). In block B14, the address information of the ante-unit, which is stored in, for example, the memory 44, is compared with the address information of the main unit to which the terminal is currently connected, thereby checking the sameness between the apparatuses.

If it is confirmed as a result of comparison that the ante-unit differs from the post-unit (YES in block 14), the IP terminal notifies the ante-unit of the normal completion (OK) of the update (block B15). This allows the ante-unit to confirm that the update of the firmware has been completed normally. The main unit notifies the operator of the corresponding information by displaying it on, for example, a display 12.

Figure 7:
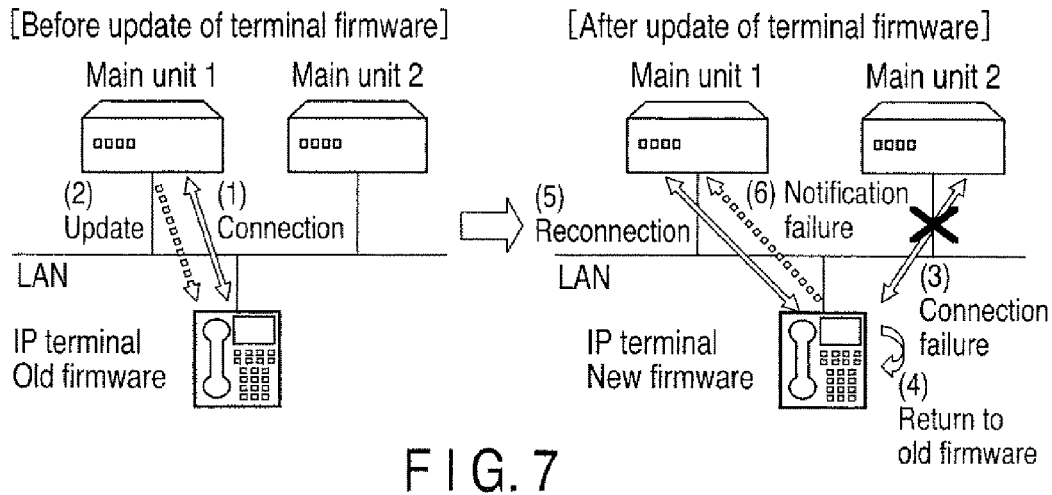
FIG. 7 is a view schematically showing a state in which the update of firmware has not been completed normally.

Referring to FIG. 6, if the new firmware cannot start normally (NO in block B11) or the IP terminal cannot be connected to the main unit 2 within a predetermined time (NO in block B13), the IP terminal reads the old firmware from the memory 44 and restarts the firmware upon loading it again (block B16). With this operation, the state before the update is recovered. As shown in FIG. 7, the IP terminal is then connected to the ante-unit 1 again to notify the apparatus that the update of the firmware has not been completed normally (NG).

As described above, in the first embodiment, the IP terminal stores access information (an IP address, a MAC address, connection information, and the like) for the ante-unit and the old firmware program before the update of the firmware. If the update of the firmware has been completed normally, the IP terminal reads access information from the memory 44, and notifies the ante-unit of the normal completion of the update by accessing the apparatus. If the update cannot be completed normally, the IP terminal reads and loads a firmware program before the update from the memory 44, and recovers the state before the update. Thereafter, the IP terminal accesses the ante-unit to notify the apparatus of the failure of the update.

This makes it possible to reliably notify the ante-unit of the result of update regardless of the success or failure of the update. The operator of the old system can therefore determine whether the firmware has been updated normally. Even if the update fails, since the state before the update is immediately recovered, the IP terminal can be connected to the original main unit. Therefore, this makes it possible to take appropriate measures, e.g., executing update again and specifying the cause of the fault. According to the above description, it is possible to provide a telephone system which improves operability associated with the update of the firmware of a terminal device and a terminal device in the system.

Second Embodiment

Figure 8:
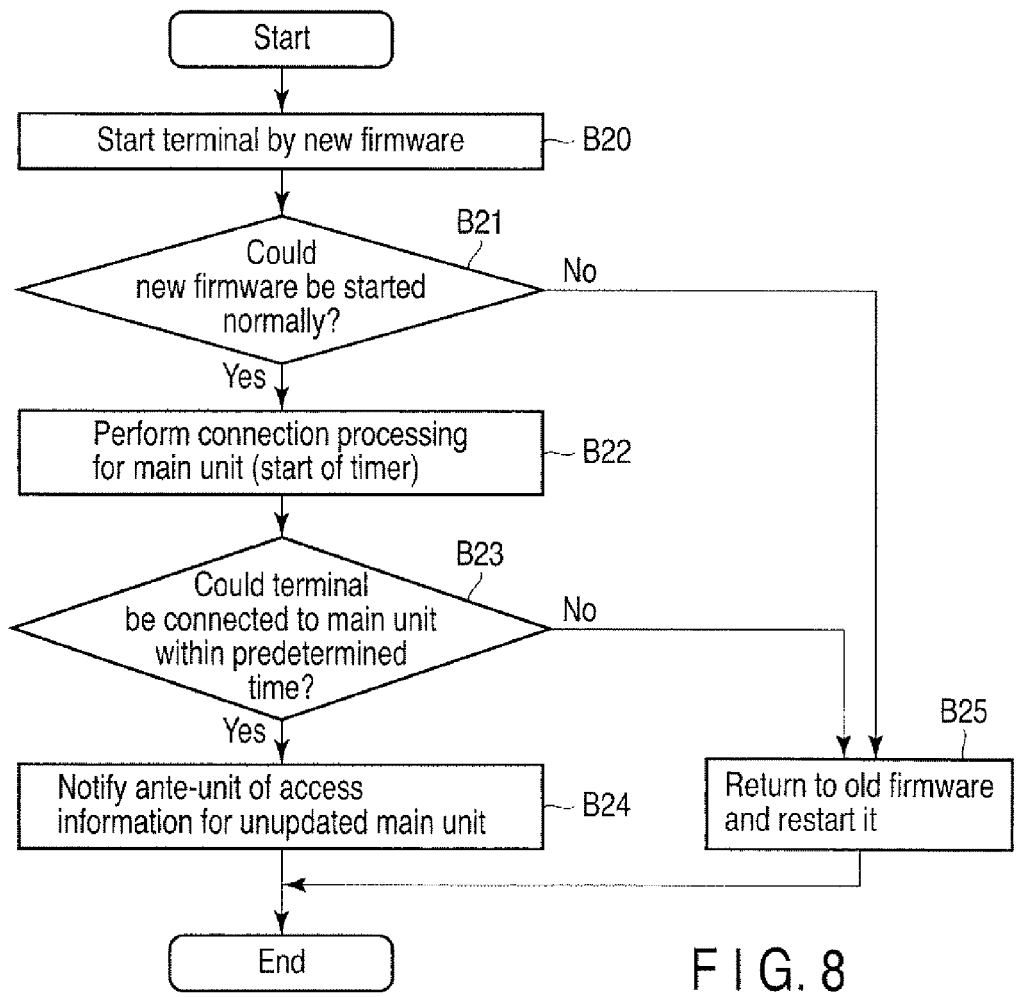
FIG. 8 is a flowchart showing a processing sequence in an IP terminal according to the second embodiment of the present invention.

According to the second embodiment of the present invention, FIG. 8 exemplary shows a processing sequence in an IP terminal. Referring to FIG. 8, when new firmware starts (block B20), the IP terminal determines whether the terminal has started normally under the new firmware (block B21), and starts connection processing for an post-unit 2 upon the start of the timer (block B22). If the new firmware cannot be started normally (NO in block B21) or the IP terminal cannot be connected to the main unit 2 within a predetermined time (NO in block B23), the IP terminal restarts upon returning to the old firmware as in FIG. 6 and recovers the state before the update (block B25).

Figure 9:
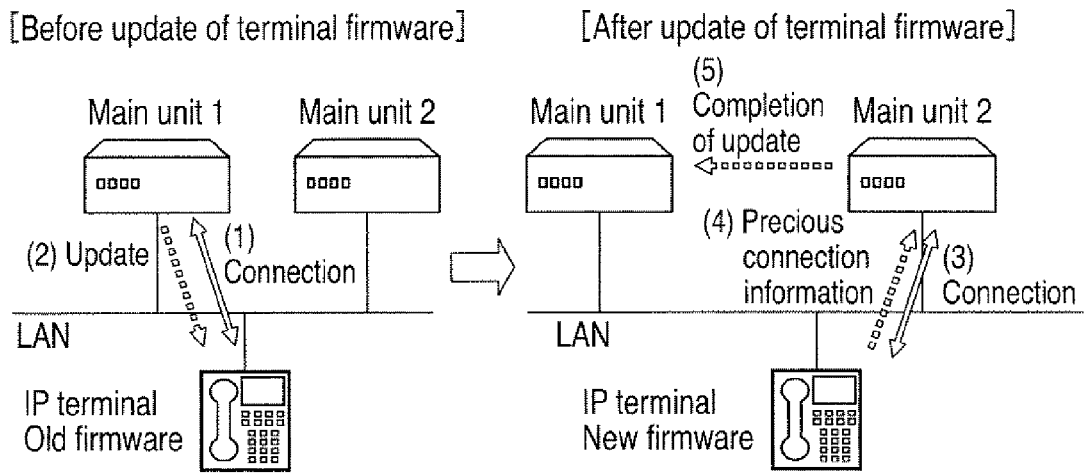
FIG. 9 is a view schematically showing how an IP terminal notifies the update of firmware via a main unit after the update.

If the update processing has been completed normally (YES in block B23), the IP terminal reads access information for an ante-unit 1 from a memory 44, and notifies the post-unit 2 of the access information, as shown in FIG. 9 (block B24).

Figure 10:
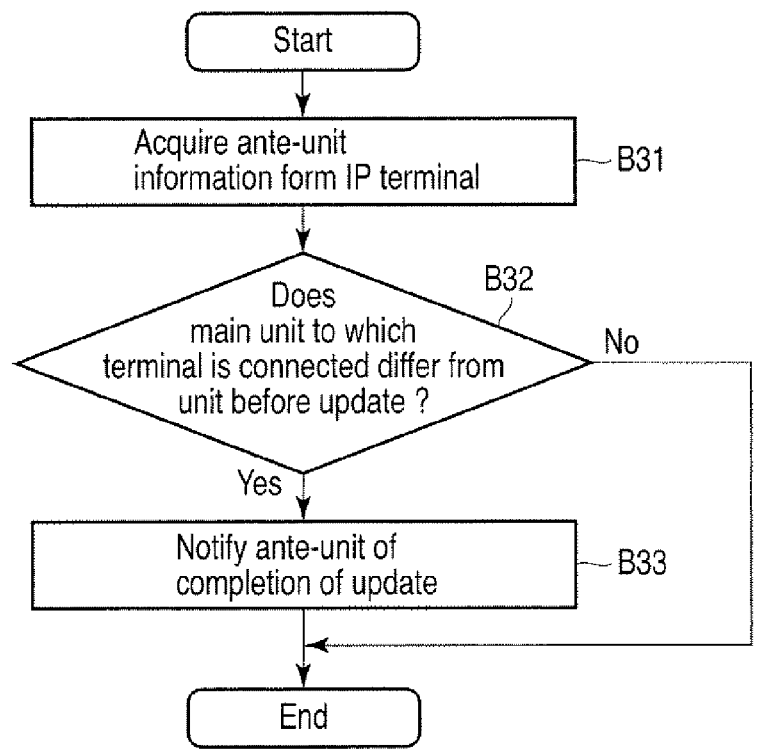
FIG. 10 is a flowchart showing a processing sequence in a main unit according to the second embodiment of the present invention.

According to the second embodiment of the present invention, FIG. 10 exemplary shows a processing sequence in a main unit. Referring to FIG. 10, upon being notified of access information from an IP terminal (block B31), the main unit determines whether the main unit before update differs from the self unit (block B32). That is, the post-unit determines whether the post-unit is the same as the ante-unit.

If the main unit before the update differs from the main unit after the update (YES in block B32), the post-unit accesses the ante-unit on the basis of the notified access information, and notifies the apparatus of the completion of the update (block B33).

As described above, in the second embodiment, after the completion of update, access information for the old main unit is notified to the new main unit, and the update result is then notified to the ante-unit via the post-unit. This can also reliably notify a main unit before update of an update result.

Note that the designation module 15b of the main unit designates the notification scheme according to the first embodiment or the notification scheme according to the second embodiment. It is possible to freely select either of the schemes in accordance with the specifications of the system. In addition, the designation module 15b can be provided on the IP terminal side, and the user can select either of the notification schemes by operating the IP terminal.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A telephone system comprising:
a plurality of terminal devices configured to perform telephone communication via a packet network; and
a main unit which accommodates the plurality of terminal devices via the packet network, wherein
each of the plurality of terminal devices comprising:
an update module configured to update firmware functioning inside the terminal device in accordance with an instruction from the main unit,
a storing unit configured to store access information for accessing an ante-unit, to which the terminal device is currently connected, before update of the firmware and to store currently functioning non-updated firmware before update of the firmware,
a read module configured to read the access information from the storing unit after update of the firmware if an post-unit to which the terminal device is to be connected under the updated firmware differs from the ante-unit,
a recovery module configured to recover a state before update by loading the non-updated firmware from the storage unit if the terminal device is not configured to be connected to the post-unit after update of the firmware, and
an access module configured to access the ante-unit by using the read access information and notify the ante-unit of the update result regardless of the success or failure of the update.

2. The system of claim 1, wherein
the access information includes address information for specifying the ante-unit, and connection information for connection to the ante-unit via the packet network.

3. A telephone system comprising:
a plurality of terminal devices configured to perform telephone communication via a packet network; and a main unit which accommodates the plurality of terminal devices via the packet network, wherein each of the plurality of terminal devices comprising:
an update module configured to update firmware functioning inside the device in accordance with an instruction from the main unit,
a first storing unit configured to store access information for accessing an ante-unit, to which the terminal device is currently connected, before update of the firmware,
a second storage unit configured to store currently functioning non-updated firmware before update of the firmware,
a read module configured to read the access information from the storing unit after update of the firmware if an post-unit to which the terminal device is to be connected under the updated firmware differs from the ante-unit,
a recovery module configured to recover a state before update by loading the non-updated firmware from the storage unit if the terminal device is not configured to be connected to the post-unit after update of the firmware, and
a notification module configured to notify the post-unit of the read access information, and the main unit comprises
an access module configured to access the ante-unit on the basis of the notified access information and notify the ante-unit of the update result regardless of the success or failure of the update.

4. The system of claim 3, wherein
the access information includes address information for specifying the ante-unit, and connection information for connection to the ante-unit via the packet network.

5. A telephone system comprising:
a plurality of terminal devices configured to perform telephone communication via a packet network; and
a main unit which accommodates the plurality of terminal devices via the packet network, the main unit comprises
a designation module configured to selectively designate either of a first notification scheme and a second notification scheme, wherein
each of the plurality of terminal devices comprising:
an update module configured to update firmware functioning inside the device in accordance with an instruction from the main unit,
a storing unit configured to store access information for accessing an ante-unit, to which the terminal device is currently connected, before update of the firmware and currently functioning non-updated firmware before update of the firmware,
a read module configured to read the access information from the storing unit after update of the firmware if an post-unit to which the terminal device is to be connected under the updated firmware differs from the ante-unit,
an access module configured to access the ante-unit by using the read access information and notify the ante-unit of the update result, when the first notification scheme is designated by the designation module, and
an access information notification module configured to notify the post-unit of the read access information, when the second notification scheme is designated by the designation module,
a recovery module configured to recover a state before update by loading the non-updated firmware from the storage unit if the terminal device is not configured to be connected to the post-unit after update of the firmware, and
the main unit comprises
a notification module configured to access the ante-unit on the basis of the notified access information and notify the ante-unit of the update result regardless of the success or failure of the update, when the second notification scheme is designated by the designation module.

6. The system of claim 5, wherein the access information includes address information for specifying the ante-unit, and connection information for connection to the ante-unit via the packet network.

7. A terminal device which is connected to a main unit including a call connection processing function via a packet network, comprising:
an update module configured to update firmware functioning inside the terminal device in accordance with an instruction from the main unit;
a storing unit configured to store access information for accessing an ante-unit, to which the terminal device is currently connected, before update of the firmware and to store currently functioning non-updated firmware before update of the firmware;
a read module configured to read the access information from the storing unit after update of the firmware if an post-unit to which the terminal device is to be connected under the updated firmware differs from the ante-unit;
a recovery module configured to recover a state before update by loading the non-updated firmware from the storage unit if the terminal device is not configured to be connected to the post-unit after update of the firmware; and
an access module configured to access the ante-unit by using the read access information and notify the ante-unit of the update result regardless of the success or failure of the update.

8. A terminal device which is connected to a main unit including a call connection processing function via a packet network, comprising:
an update module configured to update firmware functioning inside the terminal device in accordance with an instruction from the main unit;
a storing unit configured to store access information for accessing an ante-unit, to which the terminal device is currently connected, before update of the firmware and to store currently functioning non-updated firmware before update of the firmware;
a read module configured to read the access information from the storing unit after update of the firmware if an post-unit to which the terminal device is to be connected under the updated firmware differs from the ante-unit;
a recovery module configured to recover a state before update by loading the non-updated firmware from the storage unit if the terminal device is not configured to be connected to the post-unit after update of the firmware; and
a notification module configured to notify the post-unit of the read access information regardless of the success or failure of the update.

* * * * *